INVENTORS.
FRANCIS S. DENNEEN
WILLIAM C. DUNN

ATTORNEY.

Aug. 10, 1943.        W. C. DUNN ET AL        2,326,206
APPARATUS FOR ELECTRIC HEATING
Filed Jan. 27, 1939        6 Sheets-Sheet 3

INVENTORS.
FRANCIS S. DENNEEN
WILLIAM C. DUNN
BY Horace B. Fay.
ATTORNEY.

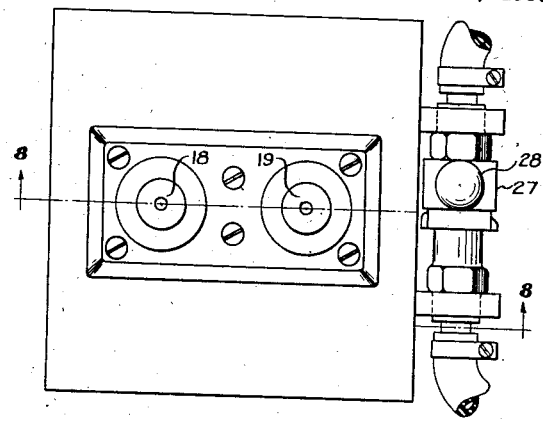
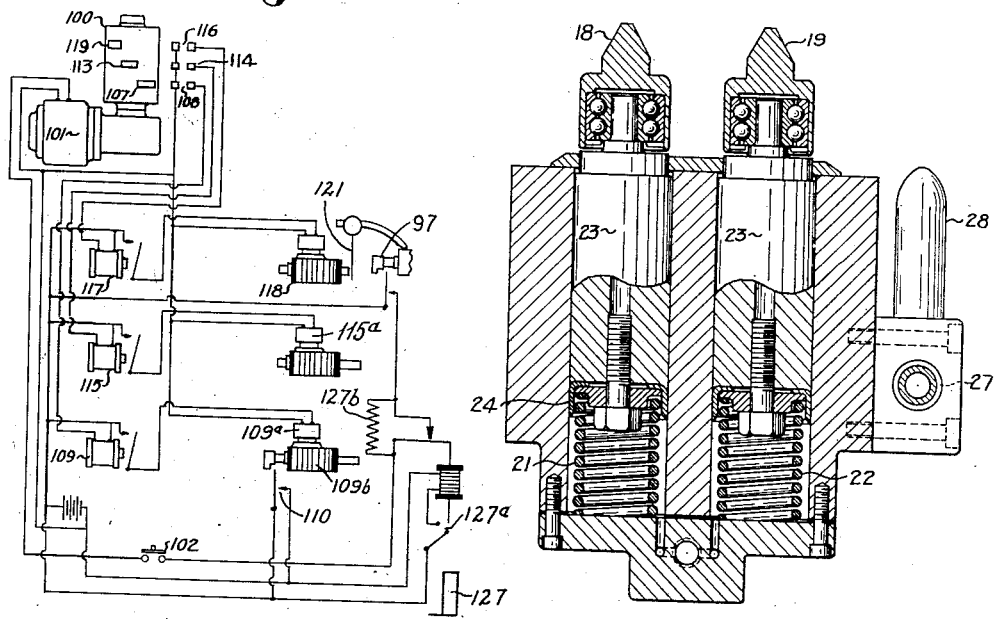
Fig. 9
Fig. 11
Fig. 8

Patented Aug. 10, 1943

2,326,206

UNITED STATES PATENT OFFICE 2,326,206

APPARATUS FOR ELECTRIC HEATING

William C. Dunn, Shaker Heights, and Francis S. Denneen, Cleveland, Ohio, assignors to The Ohio Crankshaft Company, Cleveland, Ohio, a corporation of Ohio Application January 27, 1939, Serial No. 253,168

14 Claims. (Cl. 266—4)

The present invention relates to the art of finishing camshafts and the like by providing them with a wear resistant outer surface and is more particularly directed to induction heating apparatus and the controls necessary thereto for rapid and economical production in large quantities.

Camshafts have previously been hardened by methods which were expensive and required considerable time. This was especially true when only the wear receiving portions of the surface were to be hardened, in which case it was necessary to plate the remainder of the surface and then carburize the unprotected wearing surfaces. Unless the metal forming the shaft was very low in carbon and free from impurities the old hardening treatment outlined above resulted in a coarse and brittle core which usually possessed undesirable physical characteristics.

The chief object of this invention has been to provide apparatus which will produce a camshaft hardened at the desired points and unhardened over the remainder of the surface. An additional object has been to provide control mechanism and handling equipment for accomplishing this hardening inductively and at a rapid and economical rate.

It is known that by means of induction heating a given localized zone of an article can be heated and the remainder of the surface and the interior of the article may be retained unchanged. We augment these known steps by the provision of handling mechanism for automatically heating the desired surface zones, preferably one at a time, and thereafter quenching the same to secure the desired structure. This heating and quenching tends to distort camshafts and the like and, to prevent this, we provide mechanism to hold the shaft and prevent such distortion and independent mechanism to rotate the shaft while so held. A composite inductor and quenching block is provided which moves progressively and successively over the camshaft surface and with which is incorporated timing mechanism and controls to bring each successive zone to the desired temperature and immediately thereafter quench the same. The control mechanism includes the provision of apparatus for retracting the means by which the shaft is held against distortion to allow a progressing inductor to pass thereby, and which timing mechanism then functions to return the holding means in engagement with the shaft. The entire unit is automatically operated and may be started by throwing a single switch, whereupon a complete cycle is accomplished, the mechanism returning to the starting position at the conclusion of each shaft treating cycle.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various means in which the principle of the invention may be used.

Figure 1:
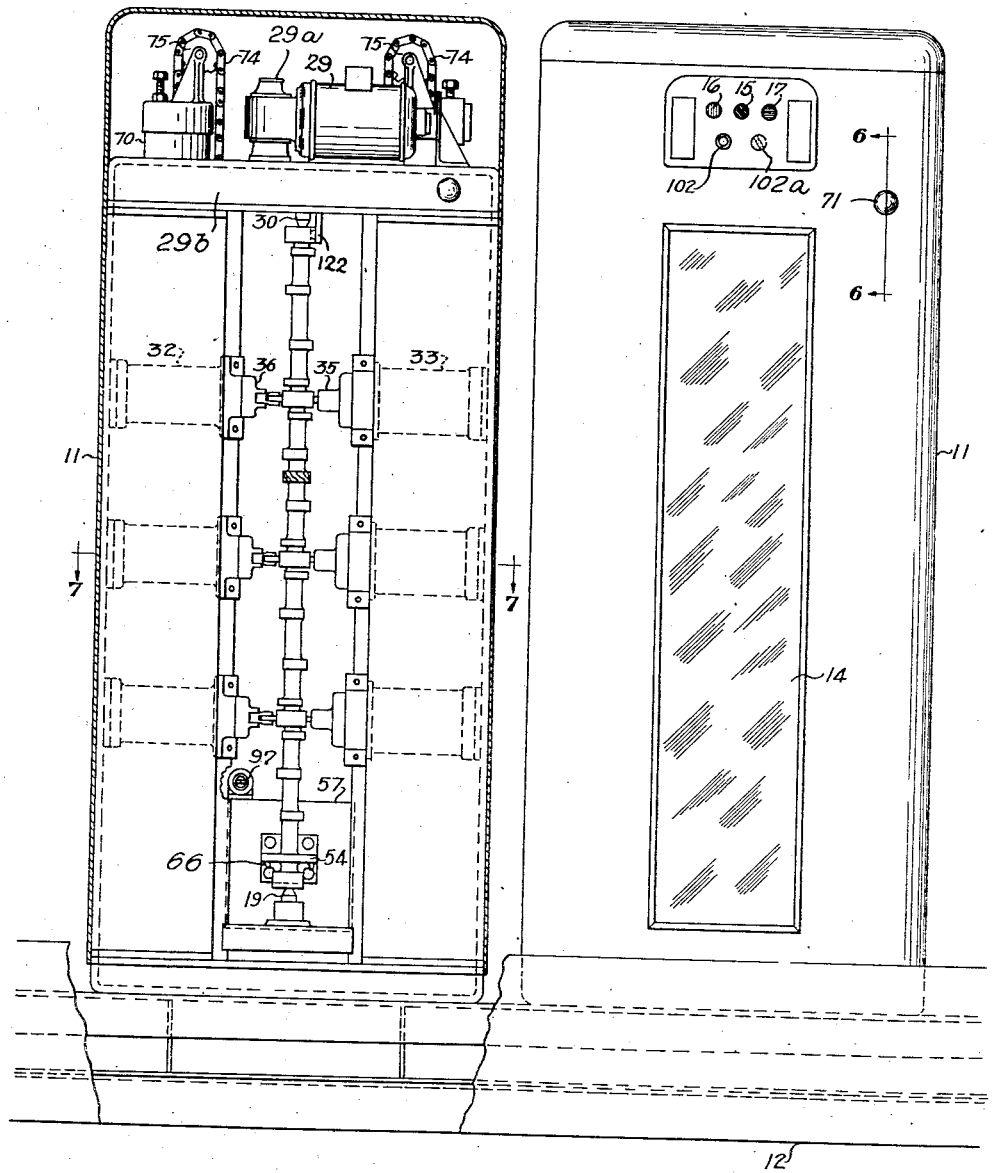
Fig. 1 is a front elevation of one unit of our invention showing an adjacent unit broken away and in section.
Figures 3, 4, 5:
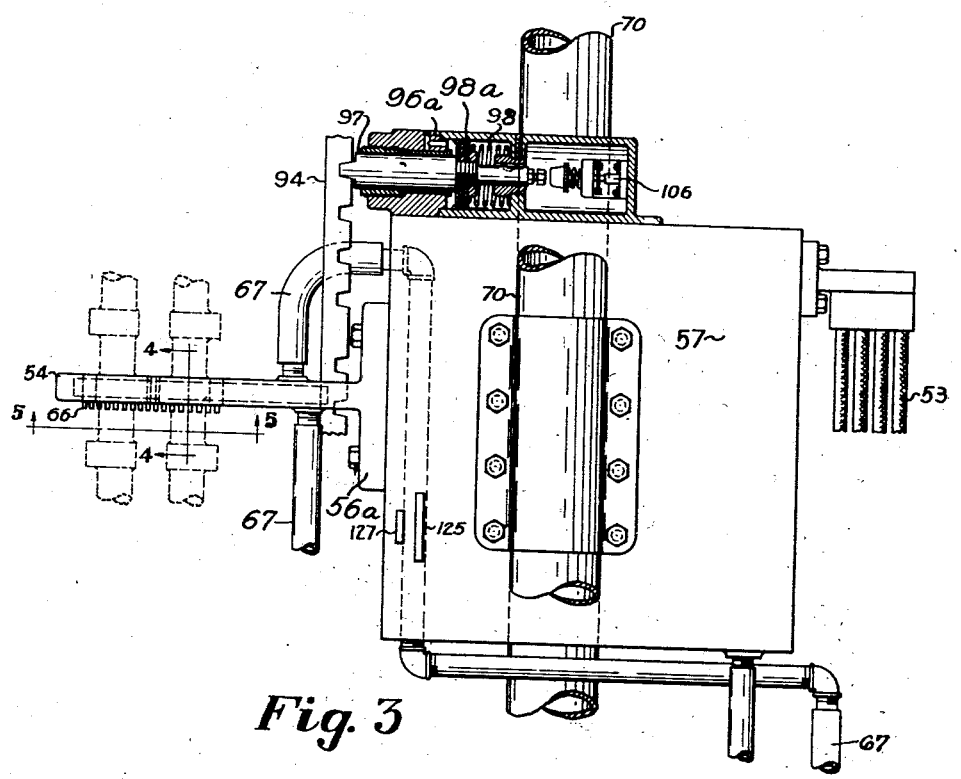
Fig. 3 is an enlarged partially fragmentary and partially sectional view of the focus inductor unit.
Figure 6:
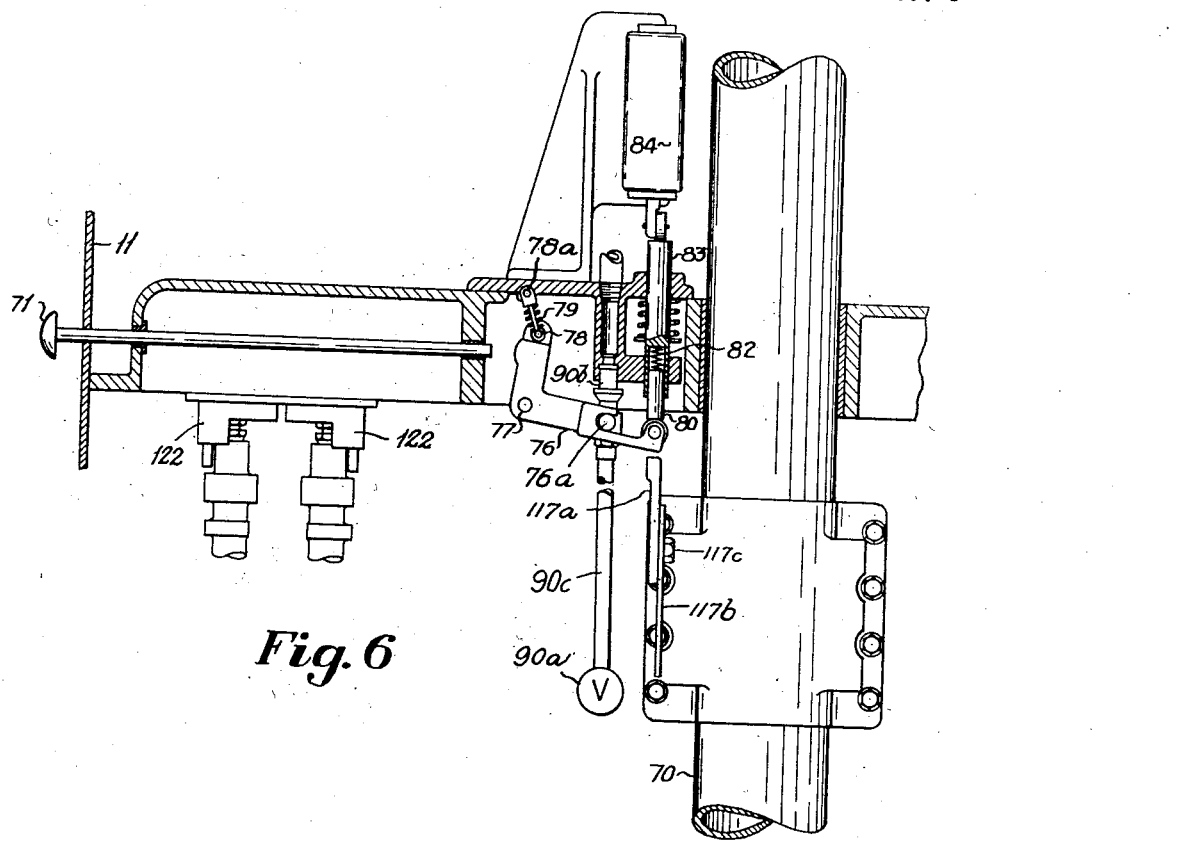
Figure 7:
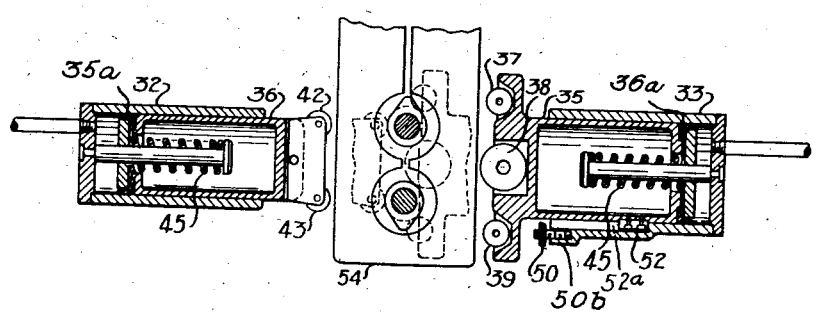

Figs. 4 and 5 are sections as indicated by the lines 4—4 and 5—5 of Fig. 3;

Figs. 6 and 7 are sections as indicated by the lines 6—6 and 7—7 of Fig. 1;

Fig. 8 is a section taken on the line 8—8 of Fig. 9;

Fig. 9 is a plan view of Fig. 8.

Figure 10:
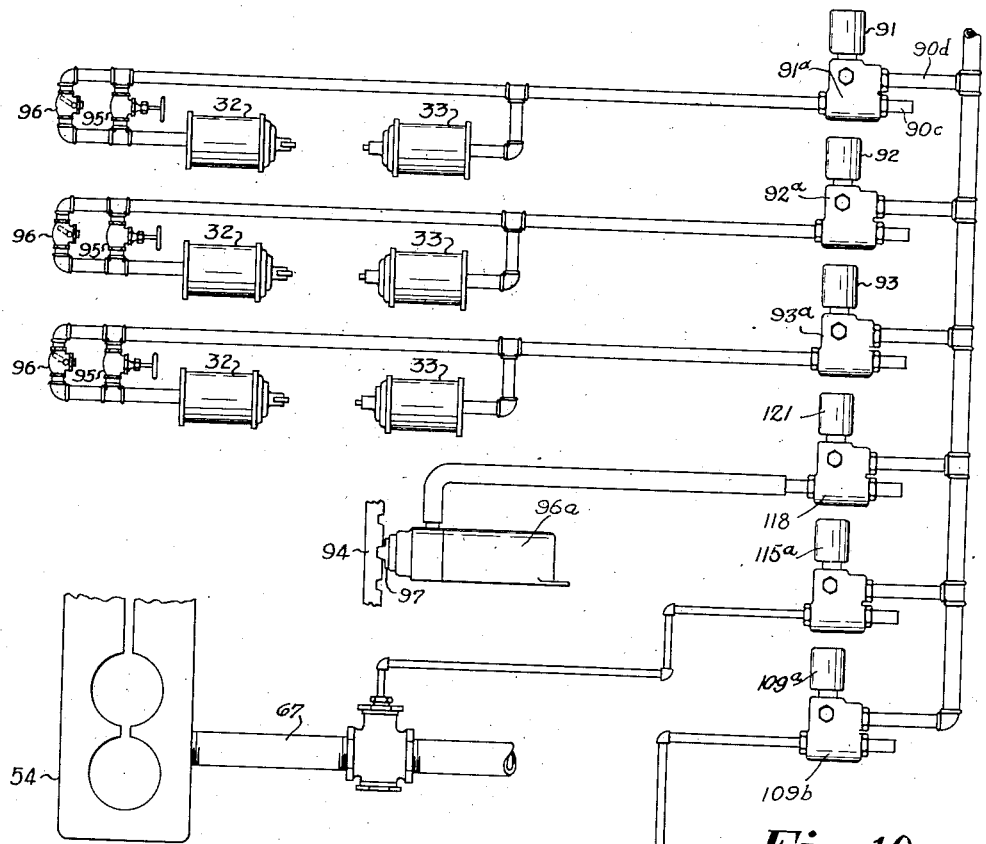

Fig. 10 is a diagrammatic illustration of the fluid control system employed;

Fig. 11 is a wiring diagram of the controls employed in our apparatus; and

Figure 12:
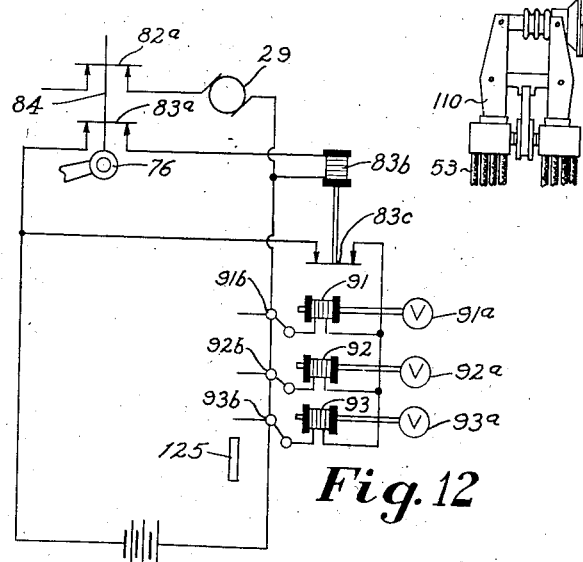

Fig. 12 is a diagrammatic showing of the electrical connections for operating the steady rest mechanism.

Figure 2:
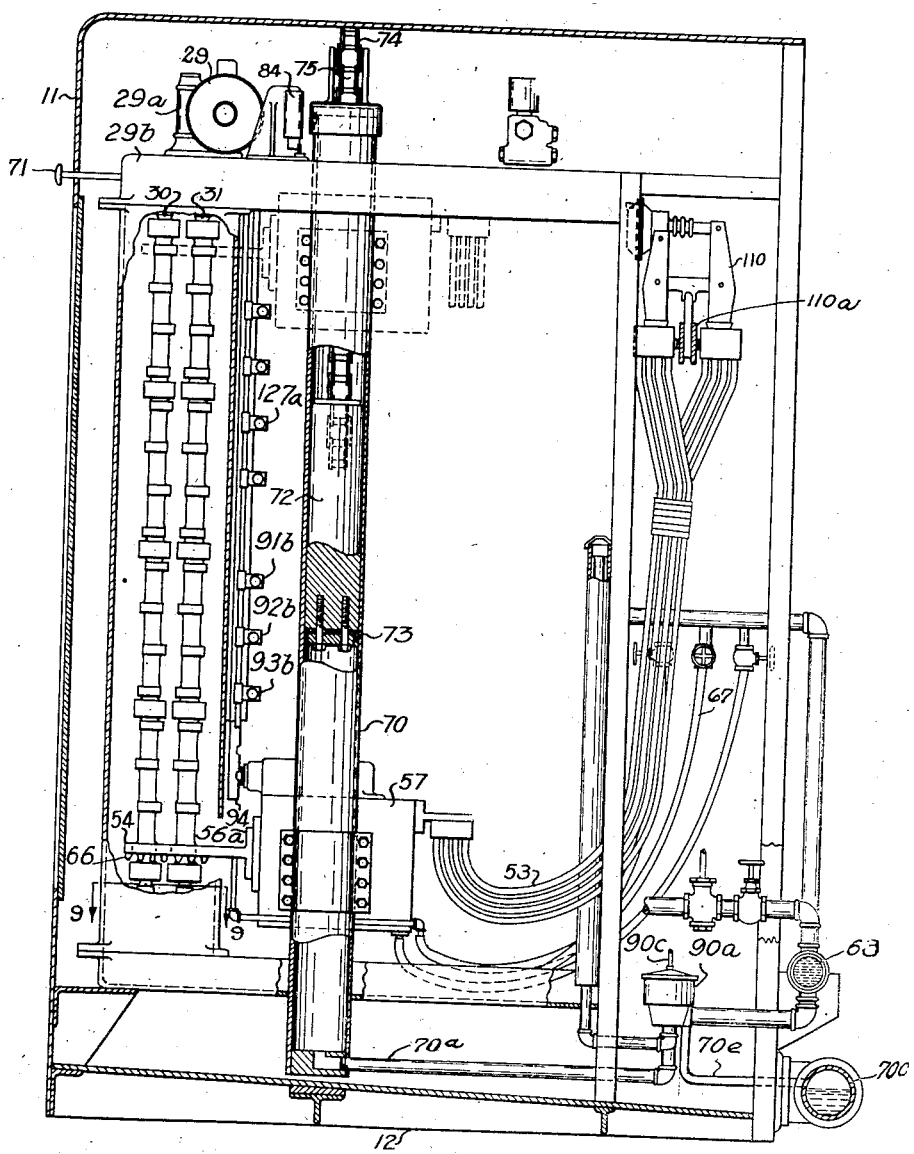
Fig. 2 is a vertical section through the apparatus normal to Fig. 1.

With the above brief outline of the apparatus in mind, and referring particularly to Figs. 1 and 2, it will be seen that we illustrate two units positioned side by side and each comprising a cabinet 11 supported on a base 12. On the front of each unit is a glass door 14, through which the operation of the apparatus may be watched and through which crankshafts may be inserted and removed. Above the door is a light panel carrying three colored lights. Of these, a green light 15 indicates that the machine is in operation, while a red light 16 indicates that a cam is being heated and a blue light 17 indicates that a cam is being quenched. Control buttons 102 and 102a for starting and stopping the heating as hereafter described are also carried by this panel.

Two shafts are normally treated at the same time in each unit and during treatment are supported vertically at their ends by center mechanism best shown in Fig. 8. This mechanism comprises a cylinder block bored to form two cylinders, in each of which is carried a fluid operated center 18 and 19 respectively. Each center is supported in an upward position by supporting springs 21 and 22 and may be depressed for insertion of a camshaft therein. The centers are rotatably carried on plungers 23 provided with packing 24 and adapted to be urged upwardly by fluid or air under pressure admitted through a valve 27 provided with a control handle 28. The valve may be turned to either admit or exhaust fluid from the cylinders.

The fluid pressure exerted against the lower centers maintains each shaft firmly against upper centers shown in Figs. 1 and 2 at 30 and 31. A suitable motor 29 by means of gearing in housing 29a, a part of which is concealed by member 29b, drives the upper centers to slowly rotate a camshaft carried between respective upper and lower centers during the heat treating operation. An effective drive is secured by reason of the tapered surfaces of the upper centers which give a wedging engagement.

Distortion tends to take place in a camshaft which is heat treated because stresses already existing in the shaft tend to be relieved and other stresses tend to rise, and such distortion occurs during the hardening process. As such a shaft is not acceptable we prevent such distortion by providing mechanism shown in Figs. 1, 7 and 10, and best shown in Fig. 7. Since the inductor member hereafter described must pass over the entire shaft it is necessary to retract the mechanism holding the shaft against distortion and again position the same after the inductor has passed thereby.

Each camshaft normally has several mid-bearings which are concentric with the shaft axis. If triangularly spaced rollers are tightly held against such bearings, distortion of the shaft is prevented and the same will remain true during heat treating.

The distortion preventing mechanism, or shaft steady rest, as shown in Fig. 7, comprises a pair of cylinders 32 and 33, to which fluid may be admitted under pressure as hereafter described. The cylinders carry pistons 35 and 36 secured against turning by means of a lug 52 engaging a keyway 52a in a wall of the cylinder the inner ends of which are sealed against leakage by cups 35a and 36a made of leather or other suitable material. The outer ends of the piston support rollers for engaging the shafts.

Each of the two shafts in a unit is gripped simultaneously and to this end the piston 35 carries three idler rollers 37, 38 and 39, driven by the rotation of the engaged shaft. Piston 36 carries two similar rollers, 42 and 43, which are normally retracted into the solid line position of Fig. 7 by respective springs 45 bearing at one end against respective piston cylinders. As pressure is applied behind the pistons they are urged toward each other until the rollers lie in the dotted line position shown in Fig. 7 to triangularly support each shaft and prevent its bending. It is not feasible to lubricate the rollers and they should be made of stellite to resist wear and oxidation in use.

To accurately center the rollers with respect to the shaft, the outward movement of the piston 35 is limited by an abutment 50 which may be adjustably positioned in the direction of travel of the piston on a stud 50b, the outer end of which is threaded. A lug 52 is carried by the piston normally sliding in a keyway of the cylinder and lies against the abutment 50 to limit the outward movement of the rollers carried thereby according to the adjusted position of the abutment. By mechanism hereafter described the piston 36 moves into active position after the piston 35 and thus the camshaft bearings are engaged and the shaft held firmly during the heat treating operation.

As also later described, the rollers are retracted when the traveling inductor member approaches them and thus allow the same to pass. Thereafter the rollers again move forwardly to engage the corresponding bearing on the shaft.

A composite inductor and quenching member, best shown in Figures 4 and 5, is provided to inductively heat the desired surface zones. As there shown, this member comprises a generally U-shaped current conductor 54 formed with two openings 55 and 56 and adapted to embrace and lie in closely spaced heating relation with the camshaft shown in dotted lines therein. Each of the arms of the U-shaped inductor has a terminal 56a connected to the secondary turns of a transformer 57 which includes a primary winding. The primary winding in turn is connected to conductors 53 (Fig. 3), which supply current to the apparatus as hereafter described.

The inductor member is provided with a hollow interior 58 which by means of a plurality of quench orifices 60 communicates with the face of openings 55 and 56, the orifices being positioned to discharge against the shaft therein.

To aid in cooling the inductor member and to prevent reheating of a cam already hardened, a second chamber 63 is provided in the inductor, which communicates with a series of nozzles 66 adapted to discharge sufficient water below the inductor to absorb any heat developing in the lower part of the shaft. For supplying quenching water to the hollow interior 58 and the chamber 63, suitable conduits 67 communicate between such interior and chamber and with a suitable source of water 68. The supply of current and quenching water to the inductor is controlled by apparatus hereafter described.

The transformer 57 and the inductor member supported thereby are vertically slidable on a pair of guide tubes 70, as best shown in Fig. 2. These guide tubes also serve as cylinders within each of which is slidably carried a counterweight 72 provided at its lower region with packing 73 to prevent leakage between the counterweight and the tube, the latter being in communication with a conduit 70a. This conduit serves as both inlet and outlet and the function thereof is controlled by a valve 90, hereinafter more fully described, which opens the conduit to a source 70b of fluid, such as water, under pressure or through pipe 70e to a drain 70c. A link chain 74 riding over pulley 75 connects the counterweight and the transformer and since the weight of the former overbalances the latter, the former normally tends to draw the inductor member upwardly to traverse the camshafts therein.

Timing mechanism is provided to correlate such movement of the inductor member with the heating and quenching operations and is shown in Figs. 10, 3, and 6. By reason of water normally pumped into the tubes behind counterweights 72 the inductor member is retained in the position shown in Fig. 2.

The operation of the system is initiated by a control button 71 which actuates a switch, shown in Fig. 6. This switch comprises a bell crank 76 hinged as at 77 and cooperating with a toggle hinged at 78 and a spring 79 to be retained in the position shown in Fig. 6 or, as hereafter described, in a reversed position on the opposite side of a line through the pivot 77 and the toggle pivot. Controlled by the bell crank is a tappet 80 which, through a spring 82 raises a plunger 83 to close contact in a limit switch 84 and energize the steady rest plungers 35 and 36 as hereafter described. The limit switch also operates to start and stop the motor 29. The raising of the bell crank 76 also actuates a valve 90a to control the flow of water in the counterweight tubes.

When the button 71 is pushed, the switch just described assumes the position shown in Fig. 6 and simultaneously starts the various units of the equipment. The motor 29 which rotates the camshafts is started. A valve indicated at 90 is opened and water within the guide tubes flows through the conduit 70a to the drain 70c, allowing the weights to slowly raise the inductor member. At the same time the limit switch closes circuits which energize solenoids 91, 92 and 93 to open valves 91a, 92a, and 93a associated therewith and admit fluid behind the steady rest pistons 35 and 36 to force the associated rollers into contact with the camshaft bearings. Adjustable needle valves 95 and check valves 96 are interposed in the line leading to each of the cylinders and are so adjusted that these cylinders fill after the pistons 35 have located their rollers in contact with the camshaft, the movement being limited as aforesaid by the lugs 52. The check valves 96 are employed to rapidly empty cylinders 32 and bypass the needle valves when the valves controlled by the solenoids 91 through 93 are opened to the exhaust.

To stop the movement of the inductor adjacent each surface to be hardened a spacing bar 94 is provided adjacent the path of travel of the transformer 57, in which are formed a series of notches corresponding to each point on the shaft to be heat treated. Plunger mechanism indicated generally at 96a is carried by the transformer 57 and includes a plunger member 97 adapted to engage the said notches. The plunger is normally urged outwardly by a spring 98 behind the same, the spring being seated against a piston fixed to the plunger and bearing against an end wall of the cylinder in which the piston 98a travels. It thus follows that as the counterweights raise the inductor and the first notch on the spacing bar is reached, the plunger will engage therewith and stop the further upward travel of the same. In this position inductive heating, followed by quenching, is accomplished at the selected station.

Timing mechanism, as shown in Fig. 11, is employed to control the duration of the heating and quenching intervals at each station and acts in conjunction with the plunger mechanism to effect a proper timing in sequence with the various areas to be hardened. To accomplish this we provide a timing drum 100 driven by a motor 101 and generally controlled by a hand switch 102.

The removal of water from the tubing 70 as heretofore described results in an upward travel of the inductor member until the first notch in the spacing bar 94 is reached at which time the engagement of the plunger in such notch allows a spring engaged switch 106 to complete the driving circuit to the motor 101 and rotate the timing drum 100.

As the drum rotates contacts are established to successively heat and quench the surface zone immediately adjacent the inductor member. Thus a drum contact strip 107 cams and closes a switch 108 which operates a relay 109 and a solenoid 109a to admit fluid to a fluid operated main bus bar switch 110 and initiate the heating period by supplying periodically varying current of the desired characteristics to the inductor member which heats the enclosed portions of the two cam shafts in the apparatus to the desired temperature for hardening. The apparatus is so set that at the time this temperature is attained the contact strip 107 moves out of proximity with the switch 108 to open the main line switch and terminate the heating operation. The period during which the switch remains closed and thus the duration of the heating period is determined by the length of such contact strip.

The heated zones are quenched to produce the desired structure after the proper temperature is attained, and to this end a second contact strip 113 is provided which functions through a switch 114 to energize a relay 115 controlling, by means of a solenoid 115a, the supply of quenching fluid to the orifices 60. As the drum continues to rotate this contact strip remains in engagement with the switch 114 and there is a continuous supply of quenching fluid to the heated parts. After the drum rotates far enough, the contact strip moves away and releases this switch and cuts off the quench supply.

The inductor is moved to the next zone to be heated upon completion of the quenching at the prior zone and the control of this movement is effected by the continued movement of the timer drum. Thus, a third contact strip 119 closes switch 116 to energize a relay 117. This in turn operates a solenoid 118 which controls a main switch 121 to admit fluid under pressure behind the piston of the plunger 97 to withdraw the plunger from its engagement with the spacing bar.

The movement of the spacing bar plunger opens the switch 106 to stop the operation of the motor and terminate the rotation of the timing drum. The apparatus is so adjusted that at the end of each heating operation the timing drum is brought to a neutral position and thus when the plunger enters the next notch in the spacing bar the circuit through the motor 101 is again closed and the heating and quenching cycle of operation is repeated at the next adjacent zone to be hardened. During the entire operation water is flowing from the nozzles 66 downwardly over that portion of the shaft already treated to keep the same cooled.

To save time in operating the apparatus it is desirable to begin to raise the counterweights and lower the inductor member after heating but before quenching the top cam zone of each of the two camshafts, and we therefore quench this zone by mechanism which operates either in addition to, or independently of, the quench orifices 60. This mechanism, as shown in Fig. 1, comprises supplementary quench tubes 122. Thus, even though the inductor and its quench mechanism has begun to move downwardly, it is possible to supply quench to the topmost zones independently.

This sequence is followed with the three sets of steady rests bearing against the corresponding shaft bearings and as the inductor member approaches each set of rollers the same are retracted to allow the inductor member to pass by. Since the inductor 54, in passing upwardly from cam to cam along the shaft, cannot pass a bearing while the steady rest rollers are in contact therewith, the rollers engaging the particular bearing to be passed are retracted at the correct time to permit such passage. This is accomplished as hereinafter pointed out by cam 125 carried by the transformer 57 engaging and opening switches 91b, 92b and 93b at the correct times and for the correct intervals. For instance, when cam 125 in moving upwardly opens switch 91b to de-energize solenoid 91, valve 91a is moved to shut off the pressure of fluid being supplied from line 90d and to release the pressure of this fluid in cylinders 32 and 33 by letting this fluid escape through outlet 90e of Fig. 10. Check valve 96 automatically opens to cause a rapid drop in pressure in the cylinder 32 and a rapid retraction of the steady rest rollers by springs 45 as hereinafter described. After the cam 125 passes and switch 91b automatically closes, solenoid 91 is thus again energized to open valve 91a and admit pressure fluid to cylinders 32 and 33. A rapid surge of the fluid into cylinder 32 is prevented by a limited opening of adjustable valves 95, check valves 96 being automatically closed by the reverse flow of the fluid in the supply lines from valve 91a. The lugs 52 engaging stop screws or abutments 50 limit the movements of pistons 35. They are maintained in this position until the inductor member is raised thereabove, at which time the cam bar 125 disengages the above switch, thus re-energizing the corresponding solenoid to shift its associated valve and re-engage the rollers with the corresponding zones of the two camshafts.

A camshaft normally carries, in addition to the cam surfaces or zones, surfaces of other type, as the bearings against which the steady rests ride, and gears. It is usually desirable to harden all of the surfaces on the shaft and to this end the spacing bar is provided with notches corresponding to each of such surfaces. Furthermore, these different surfaces normally require a heating and quenching period of different duration than the cam surfaces, which may be the largest part of the zones hardened.

We control the duration of the heating and quenching periods at these surfaces to meet these various conditions by one or more cams 127 (Figs. 3 and 11) carried on the transformer. Such a cam, during the rise of the transformer will contact and close a limit switch 127a carried adjacent thereto by the same part of the machine frame which carries switches such as 91b, 92b and 93b. This will cut in a particular resistance such as 127b to slow the timing drum motor 101 and thus provide a different duration of heating or quenching. As soon as the particular surface whose hardening is controlled by such cam is finished and the transformer begins to rise, the switch and cam will separate and the timing mechanism will be restored to its prior condition. It will be apparent from the above remarks that the machine is normally set for time periods corresponding to the heating and quenching times required for the cam configurating and that the various other surfaces each involve a special setting of the machine by the cams above stated.

After the inductor has traversed the entire length of the two shafts an abutment 117a (Fig. 6) adjustably held on its support 117b by screw 117c rocks the bell crank 76 to cut off the apparatus. This movement of the bell crank operates control member 76a of valve 90b to open this valve and admit fluid to line 90c to actuate valve 90a of Fig. 2 and this to apply fluid behind the counterweights 72 and force them upwardly, thereby lowering the transformer 57 to the position shown in Fig. 2 as pointed out heretofore. Simultaneously contact 83a in switch 84 is opened to de-energize solenoid 83b to release all steady rests through the de-energization of solenoids 91, 92 and 93, and the steady rest pistons are allowed to withdraw the rollers from contact with the shafts under the impetus of springs 45 as the fluid pressure in the respective cylinders is released. Thus the inductor may be returned to its original position without interference from the rollers which align the shafts.

The doors are then opened, the handle 28 shifted to release pressure behind the centers 18 and 19 and two heat treated shafts are removed from the apparatus. Two new shafts may then be inserted and the sequence already described is again followed by pushing the button 71.

As stated above, two shafts are mounted in a unit at once and in some instances several units are operated together.

The operation of the system is initiated by a control button 71, which upon being pushed to the right rocks bell crank 76 to the position shown in Fig. 6. This lets push rod 80 carrying spring 82 and push rod 83 to drop down which permits contacts 82a and 83a within switch 84 to close. These contacts are shown more clearly in the diagram of Fig. 12. To hold these contacts in either open or closed position the bell crank 76, which is hinged at 77 is controlled by a toggle hinged on the bell crank at 78 and on the frame at 78a. The spring 79 comprising a part of this toggle expands when the hinge pin 78 passes the line between centers 77 and 78a to hold the lower leg of the bell crank in either its upper or lower extreme positions. When in its lower position, as shown, contact 83a is closed and current is delivered to solenoid 83b to close contact 83c thus to supply current to solenoids 91, 92 and 93 which solenoids open valves 91a, 92a and 93a respectively to deliver fluid under pressure to the several groups of steady rest cylinders one of such groups being cylinders 32 and 33 of Fig. 7. The steady rest rollers are thus normally held in engagement with bearings of the shaft being treated as hereinbefore pointed out.

Other modes of applying the principle of our invention may be employed instead of the one explained, change being made as regards the structure herein disclosed, provided the means stated by any of the following claims or the equivalent of such stated means be employed.

We therefore particularly point out and distinctly claim as our invention:

1. In apparatus of the class described, a support for an elongated article to be heat treated, a combination induction heating and quenching member adapted to traverse said article to lie in closely spaced relation with successive surface acting on said article intermediate its ends to zones thereof to heat and quench the same, means hold the article in alignment against the distorting effect of heat treatment, and a second means to automatically withdraw said first means from the path of said traversing member to allow said member to pass thereby.

2. In apparatus of the class described, a support adapted to hold a pair of elongated articles parallel to each other to be treated, a member adapted to traverse said articles to lie in closely spaced relation with successive surface zones thereof to simultaneously treat the same, means acting simultaneously on both said articles intermediate their ends to hold the articles in alignment against deformation due to treating, and second means to automatically withdraw said holding means from the path of said traversing member to allow said member to pass thereby.

3. In apparatus of the class described, a support for an elongated article to be treated, a member adapted to traverse said article to lie in closely spaced relation with successive surface zones thereof to treat the same, means acting on said article intermediate its ends to hold the article in alignment, a second means to automatically withdraw said first means from the path of said member to allow said member to pass thereby, and means to automatically return said first means into position to act on said article after said traversed member has passed thereby.

4. In apparatus of the class described, a support adapted to hold a pair of elongated articles to be treated, a member adapted to traverse said articles to simultaneously treat the same, a pair of members on opposite sides of said supported articles to engage and hold the articles in alignment and means to automatically withdraw said pair of members from the path of said traversing member to allow the latter to pass thereby.

5. In apparatus of the class described, a support adapted to hold a pair of elongated articles to be treated, a member adapted to traverse said articles to simultaneously treat the same, a pair of members on opposite sides of said supported articles to engage and hold the articles in alignment, means to automatically withdraw said pair of members from the path of said traversing member to allow the latter to pass thereby, and means to automatically return said pair of members into position to act on said articles after said traversing member has passed thereby.

6. In apparatus of the class described, a frame, a support carried by said frame for an elongated article to be heated, a second support carried by said frame, a heating member carried by said second support, means to move said supports relative to each other to position said heating member and successive surface zones of said article in spaced relation with each other, movable means adapted to grip said article between two of said zones to prevent distortion of said article due to the effects of its being heated, and means responsive to relative movement of said supports to withdraw said gripping means from said article to provide space between said gripping means and said artcile for movement of said heating member while the latter moves from one to the other of said two zones.

7. In apparatus of the class described, a support for an elongated article to be treated, a heating member supported thereby adapted for traveling a path along said article and to lie in heating relation with surface zones thereof, means movably supported by said support for acting on said article intermediate its ends for holding the same in alignment, said means being in said path when acting on said article, and means responsive to said traveling for withdrawing said first-named means away from said article and out of said path whereby said member may freely travel said path without interruption.

8. In apparatus for electrically heating spaced surface zones of an elongated article, a support for said article, a member supported thereby adapted for traveling a path along said article and to be in closely spaced heating relation with successive surface zones thereof for heating said zones, a plurality of means each movably supported by said support and each adapted for acting on said article intermediate the ends thereof for holding the same in alignment, each of said means while acting on said article being in the path of said member, and means responsive to said traveling for actuating said member along said path and for individually withdrawing each of said plurality of means away from said article whereby said member may pass each of said plurality of means.

9. In apparatus for heating spaced surface zones of an article, a support for said article, a member carried by said support adapted to travel a path along said article and to lie in closely spaced relation with successive zones thereof for heating the same, means rectilinearly movable relatively to said article for acting on the same intermediate the ends thereof for maintaining the same in alignment, said means being in the path of said member while acting on said article, and means responsive to traveling of said member for withdrawing said first-named means from said article whereby said member may pass said first-named means.

10. In apparatus of the class described, means for supporting an elongated article to be heat treated by heating and quenching at successive zones therealong, a support mounted for movement parallel to said article, an inductor member carried by said support and adapted to lie in spaced inductive heating relation with successive zones of said article, quench means carried by said support to cool the heated article, means normally tending to move said support along said article, means positioned in registration with each zone of said article to be heat treated to engage and lock with said support and interrupt the normally continuous travel thereof, means operative upon each interruption to establish a periodically varying heating current in said inductor member and means operative a predetermined time after the establishment of said heating current to initiate the flow of quench over the zone just heated.

11. In apparatus of the character described, means for supporting an elongated article to be heat treated at zones therealong, a support mounted for movement parallel to said article, an inductor member carried by said support and adapted to lie in spaced inductive heating relation with successive zones of said article, means normally tending to move said support, means positioned in registration with each zone of said article to be heat treated to engage and lock said support and interrupt the normally continuous travel thereof, means operative upon each interruption to establish a periodically varying heating current in said inductor member and means operative a predetermined time after the establishment of said heating current to release said support from said engaging and interrupting means whereby said support resumes movement.

12. In apparatus of the class described, a frame, a support carried by said frame for an elongated article to be heated at zones therealong, a second support carried by said frame, a heating member carried by said second support, means to move said supports relative to each other to position said heating member and successive surface zones of said article in spaced relation with each other, means three points of which are on a plane perpendicular to the axis of said article and which three points are adapted to grip said article between two of said zones to prevent distortion of said article due to the effects of its being heated, and means responsive to relative movements of said supports to withdraw said last-named means to provide space between said last-named means and said article for movement of said heating member.

13. In apparatus of the class described, a frame, a support carried by said frame for an elongated article to be heated at spaced zones therealong, an inductive heating member carried by said frame and mounted for traversing movement in a direction coincident with the long axis of an article mounted on said support, means normally acting to move said member to traverse said article to pass in spaced relation with successive zones of said zones, means to interrupt the traversing movement of said member to position the same in spaced heating relation with the member as a primary and one of said zones as a secondary, means to apply a periodically varying current to said member to thereby heat said one zone, means adapted to grip said article between two of said zones to prevent distortion of said article due to the effect of its being heated and means responsive to said movement for withdrawing said last-named means whereby said member may pass thereby.

14. In apparatus of the class described, a support for an elongated article to be heated at spaced zones therealong, an induction heating member carried by said support and mounted for traversing movement in a direction coincident with the long axis of an article mounted on said support, means normally acting to move said member to traverse said article to pass in spaced relation with successive surface zones of said article, means to interrupt the traversing movement of said member to position the same in spaced heating relation with the member as a primary and a surface zone of the article as a secondary, means to apply a periodically varying current to said member to thereby heat said surface zone, movable article gripping means disposed between two of said zones for preventing distortion of the article, and means operative in timed relation to the heating of one of said zones to withdraw said article gripping means from said article to permit the member to pass thereby.

WILLIAM C. DUNN.
FRANCIS S. DENNEEN.

CERTIFICATE OF CORRECTION.

Patent No. 2,326,206. August 10, 1943.

WILLIAM C. DUNN, ET AL.

It is hereby certified that error appears in the printed specification of the above numbered patent requiring correction as follows: Page 4, second column, line 64-65, claim 1, for "acting on said article intermediate its ends to zones thereof to heat and quench the same, means" read --zones thereof to heat and quench the same, means acting on said article intermediate its ends to--; and that the said Letters Patent should be read with this correction therein that the same may conform to the record of the case in the Patent Office.

Signed and sealed this 14th day of September, A. D. 1943.

(Seal)

Henry Van Arsdale,
Acting Commissioner of Patents.